Dec. 30, 1947. D. A. FRENCH, SR 2,433,355
ELECTRODE HOLDER
Filed July 23, 1945
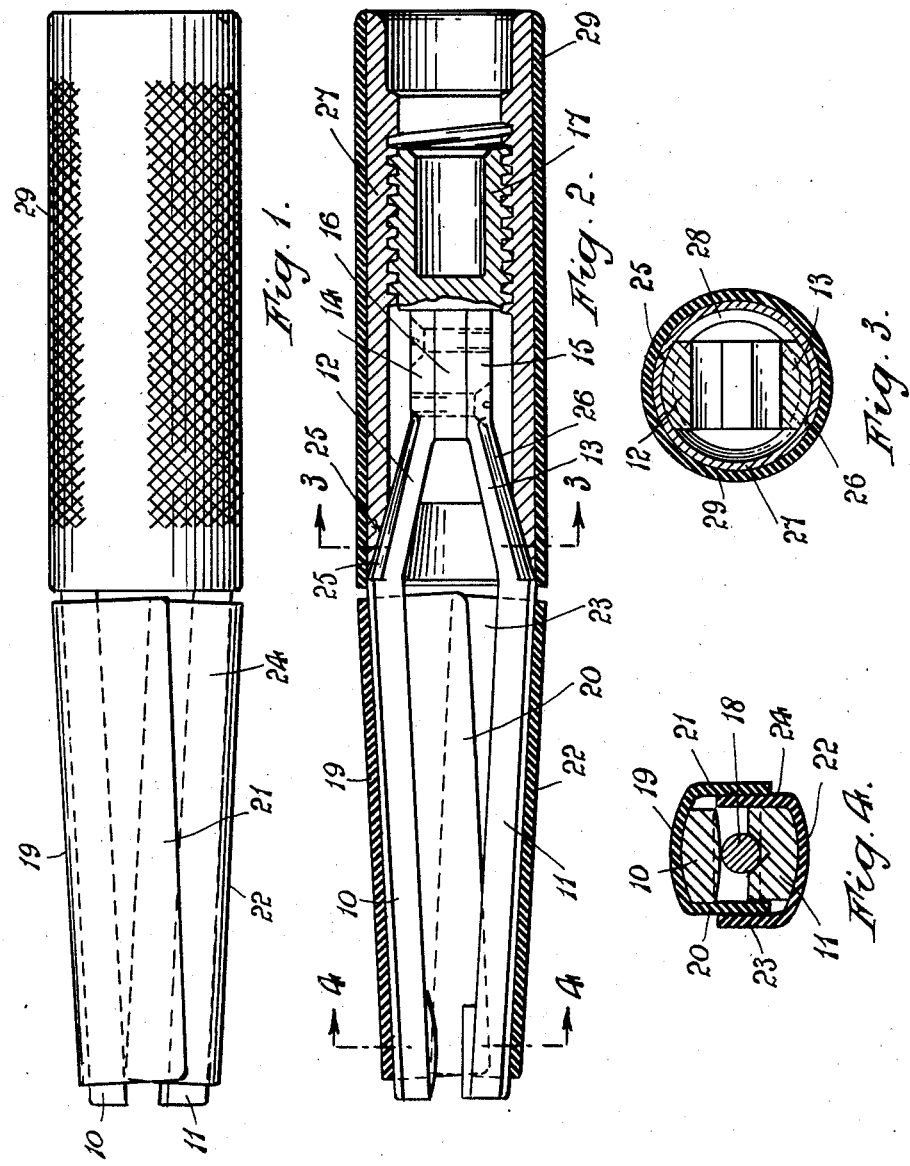
INVENTOR.
Donald A. French, Sr.
BY
Stanley Lightfoot Patented Dec. 30, 1947

2,433,355

UNITED STATES PATENT OFFICE 2,433,355

ELECTRODE HOLDER

Donald A. French, Sr., Detroit, Mich.

Application July 23, 1945, Serial No. 606,493

5 Claims. (Cl. 219—8)

This invention relates to welding electrode holders, and has for its object to provide a type of holder which is very compact and free from projecting parts, such as triggers, operating levers and so forth, so that it may be handled in confined places as by being pushed through relatively small holes in structures without the inconvenience of parts getting caught thereon; and the said invention also has for its object to provide such a device of great simplicity involving the use of a minimum of parts which may be of rugged construction and which may also be free of coil springs, hinged levers, hinge pins and such elements commonly associated with electrode holders.

A further object is to provide a device which may be opened and closed by a natural twisting effort of the hands; and in which the electrode-gripping jaws may be closed upon the welding wire by a direct manual gripping action while the other hand of the operator may effect, by a twisting action on the handle of the device, the locking of the jaws in such closed position as well as the increasing of the jaw pressure on the wire, if so desired.

Still further, the invention contemplates the provision of spring jaws capable of manual convergence on the welding wire, and a manually rotatable handle operable to effect a wedging action on said jaws to effect a locking and closing pressure on said jaws.

Still further, the said invention contemplates, in such a device having spring jaws, hand grips on said jaws and the slidable overlapping of the side walls of the said hand grips for effective insulation of the jaws from the hand of the operator during the jaw-closing operation.

In carrying the said invention into effect, I may provide a pair of resiliently mounted or spring jaws sheathed with relatively interlocking insulation to provide a hand grip whereby the said jaws may be manually compressed on a welding wire placed therebetween; a threaded member from which said jaws extend; and a rotary barrel threaded on said member, said barrel having a tapered seat adapted to engage correspondingly tapered surfaces on the inner portions of said jaws so that, upon the rotation of said barrel on the threaded member in the required direction, the tapered seat will be forced over the correspondingly tapered surfaces of the jaws to exert a compressive effort on the jaws. All of which is more particularly described and ascertained hereinafter, by way of example, having reference to the accompanying drawing, wherein:

Figure 1 is an elevation of my improved electrode holder;

Figure 2 is a longitudinal section of the same, the internal jaw structure being shown in elevation;

Figure 3 is a cross section taken on a plane indicated by the line 2—3 in Figure 2; and Figure 4 is a cross section taken on a plane indicated by the line 4—4 in Figure 2.

Similar characters of reference indicates similar parts in all the figures of the drawing.

10 and 11 indicate the jaws of the device and these have converging shoulder portions 12 and 13 attached at 14 and 15 to a tongue 16 on the forward end of an externally threaded member 17. It is intended that these jaws be of such construction and so mounted that they may be flexible relative to one another to such extent that they may be closed upon a welding wire, such as 18, by the contractive effort of the hand of an operator grasping the free end portions of the said jaws.

To protect the hand during such a jaw-closing operation, I enclose the free end portion 10 of the upper jaw with an insulating cover 19 having side walls 20 and 21, and likewise enclose the free end portion 11 of the lower jaw with a similar insulating cover 22 having side walls 23 and 24, the side walls of the said insulating covers 19 and 22 slidably overlapping to provide a laterally variable tubular enclosure for the two jaws, as clearly shown in Figure 4.

The shoulder portions 12 and 13 of the said jaws are provided with conical tapered seats 25 and 26. A tubular handle 27, having internal threaded engagement with the member 17, is also provided at its forward end with an internal conical seat 28. Consequently the twisting of the handle (in this case in an anti-clockwise or left hand direction) while the jaws are held against rotation by the other hand of the operator, will result in forward movement of the said handle and the forcing of the seat 28 thereof over the tapered surfaces 25 and 26 of the shoulders 12 and 13 of the said jaws. Obviously this will produce a closing effect on the jaws so that they will then be locked in the position to which they have been converged by the grip of the operator's hand thereon, further rotation of the handle 27 serving to increase the closing pressure of the jaws on the welding wire, as may be desired.

It will be apparent that a reverse rotation of the handle, while the jaws are held against rotation, will release the said jaws so that they may diverge as a result of their spring action.

Suitable insulating covering 29 for the handle may be provided, and such insulation of both the handle and of the jaws may be secured to the parts by direct moulding thereon or in such other manner as convenience may dictate.

This invention may be developed within the scope of the following claims without departing from the essential features of the said invention, and it is desired that the specification and drawing be read as being merely illustrative of a practical embodiment of the said invention and not in a strictly limiting sense.

What I claim is:

1. In an electrode holder, a pair of resiliently mounted attenuated jaws having tapered shoulder portions, a threaded member to which said jaws are connected, and a tubular handle threaded on said member and having a conical internal seat adjustably engaging the tapered shoulder portions of said jaws, said jaws diverging for a portion of their length and converging from a point adjacent the handle to the extremities thereof.

2. In an electrode holder, a pair of resiliently mounted elongated jaws having tapered shoulder portions, a threaded member to which said jaws are connected, a tubular handle threaded on said member and having a conical internal seat adjustably engaging the tapered shoulder portions of said jaws, said jaws being divergent from the threaded member for a portion of their length and converging from a point adjacent the handle to the tips of said jaws for the remainder of their length, and hand grips on the free end portions of said jaws.

3. In an electrode holder, a pair of resiliently mounted attenuated jaws having tapered shoulder portions, a threaded member to which said jaws are connected, a tubular handle threaded on said member and having a conical internal seat adjustably engaging the tapered shoulder portions of said jaws, and insulating hand grips on the free end portions of said jaws, said hand grips being provided with flanged portions extending along their edges beyond the meeting faces of said jaws and being arranged in overlapping relationship to maintain complete enclosure thereof during operative motions of said jaws.

4. In an electrode holder, a pair of resiliently mounted jaws, insulating hand grips on said jaws to facilitate manual closing of said jaws by direct squeezing thereof, a handle for said jaws, and means operable by said handle for locking said jaws in closed position, said hand grips being of channel section with their side edge portions arranged in overlapping relationship to completely enclose the jaws and the inoperative end of an electrode.

5. In an electrode holder, a pair of resiliently mounted jaws, insulating hand grips on said jaws to facilitate manual closing of said jaws by direct squeezing thereof by one hand of the operator, and a handle movable by the other hand of the operator into and out of locking engagement with said jaws, said hand grips being of channel section with their side edge portions arranged in overlapping relationship to completely enclose the jaws and the inoperative end of an electrode.

DONALD A. FRENCH, Sr.

REFERENCES CITED

The following references are of record in the file of this patent:

UNITED STATES PATENTS

| Number | Name | Date |
|---|---|---|
| 712,239 | Barrett | Oct. 28, 1902 |
| 2,003,196 | Jackson | May 28, 1935 |
| 2,086,587 | Thomson | July 13, 1937 |
| 2,372,113 | Opgenorth | Mar. 20, 1945 |